March 29, 1938.  E. P. SEXTON  2,112,427
FLUID PRESSURE BRAKE
Filed July 20, 1937
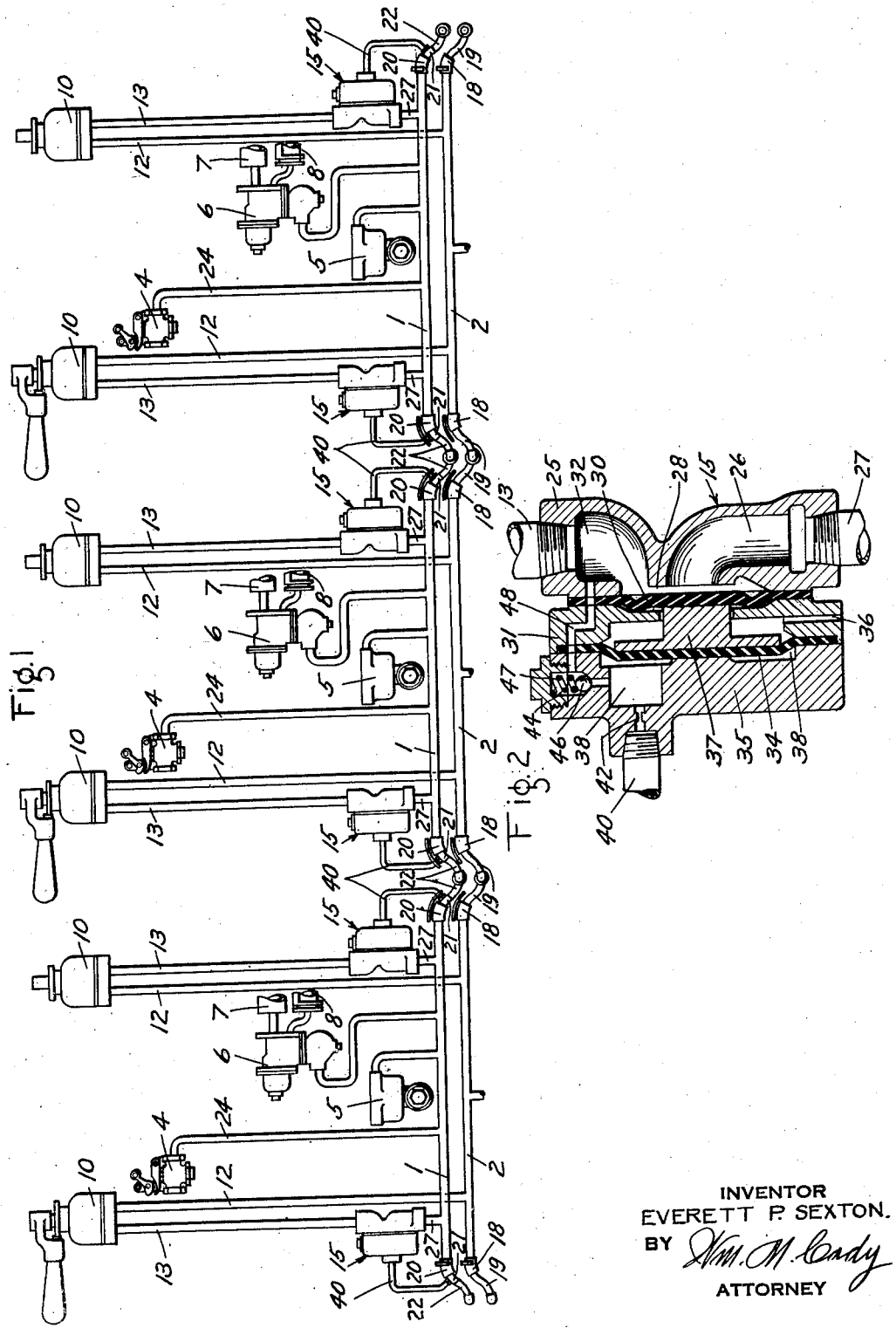
INVENTOR
EVERETT P. SEXTON.
BY *Wm. M. Cady*
ATTORNEY Patented Mar. 29, 1938

2,112,427

UNITED STATES PATENT OFFICE 2,112,427

FLUID PRESSURE BRAKE

Everett P. Sexton, East McKeesport, Pa., assignor to The Westinghouse Air Brake Company, Wilmerding, Pa., a corporation of Pennsylvania Application July 20, 1937, Serial No. 154,621

18 Claims. (Cl. 303—14)

This invention relates to a vehicle fluid pressure brake equipment, and particularly to a brake equipment of the type employing a brake pipe normally charged with fluid under pressure, and having means operated on a reduction in brake pipe pressure for effecting an application of the brakes.

The brake equipment of some railways, such as certain electric traction railway systems, includes vehicles provided at one or both ends with control equipment, including a motor controller for controlling the driving motors on a car, and a brake valve for controlling the brakes on the car when the car is operated singly, or to control a train consisting of the plurality of similar cars.

Each of the brake valves is connected to the brake pipe by way of a branch pipe, and as cars of this type are usually constructed, relatively long branch pipes must be employed to connect the brake valves with the brake pipe with the result that each branch pipe has considerable volume.

On a reduction in brake pipe pressure to effect an application of the brakes on the cars of a train fluid under pressure will flow from the branch pipes to the brake pipe, and tend to maintain the pressure of the fluid in the brake pipe, while the flow of fluid from the branch pipes to the brake pipe creates a turbulence in the brake pipe which interferes with and retards the transmission of a reduction in brake pipe pressure throughout the train. This delays the application of the brakes on the cars at the rear of a train, and causes a rapid run in of the slack of the train with consequent objectionable slack action.

The brake valves at the ends of the various cars of a train, except the brake valve at the forward end of the leading car, are not employed to control the brakes on the train, and it has heretofore been proposed to provide valve means to cut off communication between the brake pipe and the branch pipes, except the branch pipe leading to the brake valve at the forward end of the leading car of the train, to thereby isolate the branch pipes and prevent objectionable flow of fluid under pressure from the branch pipes to the brake pipe on a reduction in brake pipe pressure.

The means heretofore suggested included manually controlled valves, or valve devices operable in accordance with whether the end of a car is coupled to another or not, to cut off communication between the brake pipe and the branch pipes. However, these valves isolated the brake valves from the brake pipe so that a reduction in brake pipe pressure could not be effected by operation of the brake valves. Accordingly, if a trainman situated at a point in the train other than at the front of the train desired for any reason to effect an application of the brakes on the train, he was unable to do so by operation of a brake valve. While each car of this type is provided with a conductor's valve by means of which fluid under pressure may be released from the brake pipe to produce an emergency application of the brakes, this may not be conveniently accessible to the trainman when he desires to apply the brakes, or if he attempts to apply the brakes by means of the brake valve, so much time may elapse before he learns that the brake valve cannot effect an application of the brakes that a collision may result.

It is an object of this invention to provide improved means to isolate from the brake pipe the branch pipes leading to normally inoperative brake valves, and prevent flow of fluid from these branch pipes to the brake pipe on a reduction in brake pipe pressure.

A further object of the invention is to provide improved means of the type described which is arranged to permit the brake valve to be employed to release fluid from the brake pipe to produce an application of the brakes even though the means associated with the branch pipe leading from this brake valve to the brake pipe is conditioned to prevent flow of fluid from the branch pipe to the brake pipe.

Another object of the invention is to provide means of the type described which is automatically operable to permit communication between the branch pipe and the brake pipe, or to isolate the branch pipe from the brake pipe in accordance with whether the end of the car on which the branch pipe is mounted is coupled to another car or not.

A further object of the invention is to provide improved means of the type described which is simple in construction and positive in operation.

Other objects of the invention and features of novelty will be apparent from the following description taken in connection with the accompanying drawing, in which Fig. 1 is a diagrammatic view of a train of cars provided with brake equipment embodying my invention, and Fig. 2 is an enlarged sectional view of a valve device employed in the brake equipment shown in Fig. 1.

Referring to Fig. 1 of the drawing there is shown diagrammatically therein a portion of the brake equipment on three cars provided with brake equipment embodying this invention. Each of the cars is provided with a brake pipe 1, a supply pipe 2, a conductor's valve 4, a vent valve device 5, a brake controlling valve device 6, an auxiliary reservoir 7, and a brake cylinder 8.

In addition, each of the cars is provided at each end with a brake valve 10 which is connected with the supply pipe 2 by way of a pipe 12. Each of the brake valves 10 is also connected with the brake pipe 1 by means of a branch pipe 13, while each of these branch pipes has associated therewith a valve device 15 provided by this invention for controlling communication between the brake pipe and the branch pipe.

The brake pipe and supply pipe on each of the cars extends to the ends of the car. The supply pipe 2 has interposed therein at its ends suitable angle cocks 18 to which are connected flexible hose and couplings 19, which may be connected together to establish communication between the supply pipes on cars which are coupled together.

When the end of a car is coupled to another car, the angle cock 18 at this end of the car is turned to the open position, while when the end of the car is not coupled to another the angle cock 18 at this end of the car is closed.

Similarly, the brake pipe on each of the cars has at each end thereof an angle cock 20, while each of these angle cocks has secured thereto a pipe T 21 to one branch of which is secured a flexible hose and coupling 22, which, when the end of the car is coupled to another, is connected to a similar flexible hose and coupling to establish communication between the brake pipe on the coupled cars. When the end of a car is coupled to another, the angle cock 20 at the end of the brake pipe at this end of the car is turned to the open position with the result that the hose and coupling at this end of the car is charged with fluid under pressure, while when the end of a car is not coupled to another, the angle cock 20 at this end of the car is turned to the closed position and the hose and coupling at this end of the car will not be connected to another, but is open to the atmosphere.

The conductor's valves 4 may be of any suitable well known construction and are connected with the brake pipe 1 by suitable branch pipes 24. The conductor's valves 4 may be operated in the usual manner to release fluid under pressure from the brake pipe 1 at an emergency rate to effect an emergency application of the brakes.

The vent valve devices 5 may be of any suitable well known construction, and are operated on a reduction in brake pipe pressure at an emergency rate to vent fluid under pressure from the brake pipe.

The brake controlling valve devices 6 likewise may be of any well known construction, and each controls the supply of fluid under pressure from the brake pipe 1 to an auxiliary reservoir 7, the supply of fluid under pressure from the auxiliary reservoir 7 to a brake cylinder 8, and the release of fluid under pressure from the brake cylinder 8. The brake controlling valve devices 6 are operated on an increase in brake pipe pressure to release fluid from brake cylinders 8, and to supply fluid under pressure to the auxiliary reservoirs 7, while these valve devices are operated on a reduction in brake pipe pressure to supply fluid under pressure from the auxiliary reservoirs to the brake cylinders to effect an application of the brakes.

The construction of the valve devices 15 is clearly shown in Fig. 2 of the drawing, where it will be seen that these valve devices each comprise a body 25 having a passage 26 therein which is connected by way of a relatively short pipe 27 with the brake pipe 1. The end of the passage 26 is surrounded by a seating face 28 which is adapted to be engaged by a face of a diaphragm 30, which is clamped between the body 25 of the valve device 15 and a member 31. The area or chamber 32 at the face of the diaphragm 30 outwardly of the seating face 28 is open to a branch pipe 13.

The valve device 15 is provided with a movable abutment in the form of a diaphragm 34 which is clamped between the member 31 and a member 35. The member 31 has a central bore therein in which is mounted a plunger 37 which extends between a face of the diaphragm 34 and the diaphragm 30 and is operative by the diaphragm 34 to press the diaphragm 30 against the seating face 28, while the chamber between the diaphragms 30 and 34 is open to the atmosphere through a passage 36.

The diaphragm 34 is subject on the other face to the pressure of the fluid in a chamber 38, while the various parts of the valve device 15 are arranged and proportioned so that the area of the diaphragm 34 which is exposed to fluid under pressure in the chamber 38 is substantially greater than the area of the diaphragm 30 which is exposed to fluid under pressure in the chamber 32 and in the passage 26.

The valve device 15 has associated therewith a pipe 40 which leads from the chamber 38 to a T 21 located in the brake pipe at the flexible hose side of the angle cock, while a choke 42 is provided to restrict the rate of flow of fluid from the pipe 40 to the chamber 38.

The member 35 has a valve chamber 44 formed therein in which is mounted a ball check valve 46, which is adapted to seat on a seat surrounding a passage open to the chamber 38, while a coil spring 47 is mounted in the chamber 44 for pressing the check valve 46 to the seated position. The valve chamber 44 is connected by way of a passage 48 with the chamber 32, and thereby with the branch pipe 13.

In the operation of the brake equipment, the supply pipe 2 on the cars of the train shown in Fig. 1 is supplied with fluid under pressure by suitable means, not shown, while the handles of all of the brake valves 10, except that of the brake valve at the forward end of the leading car, which for purposes of illustration is assumed to be located at the left hand end of Fig. 1 of the drawing, are turned to a lap position in which fluid under pressure is neither supplied to nor released from the brake pipe.

The handle of the brake valve 10 at the forward end of the leading car is turned to the release position in which fluid under pressure is supplied from the supply pipe 2 to the brake pipe 1. Fluid under pressure supplied to the brake pipe 1 flows through the angle cocks 20 and the flexible hose and couplings 22 to the brake pipe on the other cars of the train, while fluid under pressure supplied to the brake pipe flows therefrom to the brake controlling valve devices 6, causing the pistons of these devices to move to their release positions, if they are not already in this position, in which the brake cylinders 8 are connected to the atmosphere, and in which fluid under pressure may flow to the auxiliary reservoirs 7 to charge these reservoirs with fluid at the pressure supplied to the brake pipe 1.

Fluid under pressure supplied from the brake pipe 1 to the flexible hose and couplings 22, which connect the brake pipe on adjoining cars, flows therefrom to the pipes 40, and thence at a restricted rate through the chokes 42 to the chambers 38 of the valve devices 15, while on an increase in the pressure of the fluid in the chamber 38 of each of these valve devices, fluid under pressure flows past the ball check valves 46, and thence by way of passages 48 to the chambers 32 of the valve devices 15 and to the branch pipes 13 associated with the valve devices 15. Fluid under pressure will continue to flow from the flexible hose and couplings 22 by way of the pipes 40 and through the chokes 42 to the chambers 38, and thence to the branch pipes 13 until the chambers 38 and the branch pipes 13 are charged with fluid under pressure substantially to the pressure supplied to the brake pipe 1. On this increase in the pressure of fluid in the chambers 38, the force exerted by this fluid on the diaphragms 34 substantially exceeds the opposing force of the fluid under pressure in the passages 26, and in the chambers 32, upon the diaphragms 30, since, as pointed out above, the area of the diaphragms 34 subject to fluid under pressure substantially exceeds the area of the diaphragms 30 subject to fluid under pressure.

Accordingly the diaphragms 34 will press against the plungers 37 and move the diaphragms 30 against the seating faces 28 surrounding the ends of the passages 26 to thereby cut off communication between the branch pipes 13 and the passages 26 which are connected through the pipes 27 to the brake pipe 1.

As pointed out above, the angle cocks 20 at the ends of the train are in their closed position, while the flexible hose and couplings 22 at the ends of the train are open to the atmosphere. Accordingly, fluid under pressure will not be supplied to the pipes 40 leading to the valve devices 15 at the ends of the train, and the chambers 38 in these valve devices will remain at atmospheric pressure, since the pipes 40 are connected with the brake pipe at the flexible hose side of the angle cocks at the ends of the train. Fluid under pressure supplied to the brake pipe 1 fluid will flow therefrom by way of the pipe 27 to the passage 26 at the valve device 15 at the rear end of the train, and the fluid under pressure operating upon the face of the diaphragm 30 will move this diaphragm away from the seating face 28 to permit fluid under pressure to flow from the passage 26 to the chamber 32 and thence to the branch pipe 13 leading to the brake valve 10 at the rear of the train.

Similarly, on the supply of fluid under pressure to the branch pipe 13 by the brake valve 10 at the forward end of the leading car, fluid will flow to the chamber 32 and the force exerted upon the diaphragm 30 will move it away from the seating face 28 to permit fluid under pressure to flow to the passage 26, and thence to the brake pipe 1.

On the supply of fluid under pressure to the chambers 32 of the valve devices 15 at the ends of the train, fluid under pressure flows therefrom by way of the passages 48 to the valve chambers 44, but as the ball check valves 46 are held in their seated positions by the springs 47 fluid under pressure cannot flow to the chambers 38.

It will be seen therefore that at the ends of the cars which are coupled together, the valve devices 15 operate automatically to cut off communication between the brake pipe and the branch pipes, while at the ends of the cars which are not coupled to other cars, the valve devices 15 operate automatically to establish communication between the brake pipe and the branch pipes leading to the brake valves at these ends of the cars.

If it is desired to effect a service application of the brakes by operation of the brake valve 10 at the forward end of the car, the handle of this brake valve is turned to the service application position in which the supply of fluid under pressure to the branch pipe 13 leading to the brake pipe 1 is cut off, and in which fluid under pressure is released from the branch pipe 13 at a service rate. On this release of fluid under pressure from the branch pipe 13 fluid under pressure may flow from the brake pipe 1 to the branch pipe 13 through the control valve device 15, because, as pointed out above, the diaphragm 30 of this valve device is not held in engagement with the seating face 28 at this time.

On this release of fluid under pressure from the brake pipe at a service rate there is a reduction in the pressure of the fluid throughout the brake pipe on the train, and the brake controlling valve devices 6 operate in the usual manner to supply fluid under pressure from the auxiliary reservoirs 7 to the brake cylinders 8 to thereby effect an application of the brakes.

On a reduction in the pressure of the fluid in the brake pipe, fluid under pressure flows to the brake pipe from the chambers 38 of the valve devices 15 at the rear of the first car, on the second car, and at the front of the third car, thereby reducing the pressure of the fluid in the chambers 38. However, the flow of fluid under pressure from the chambers 38 to the brake pipe is at a relatively slow rate because of the restricted flow capacity of the chokes 42, while the volume of the pipes 40 is so small that the flow of fluid from these pipes to the brake pipe has negligible effect on the pressure of the fluid in the brake pipe. On the reduction in the pressure of the fluid in chambers 38 fluid under pressure cannot flow to these chambers from the branch pipes 13 as the ball check valves 46 prevent back flow of fluid through the passages 48.

The various parts of the control valve devices 15 are arranged and proportioned so that even when the pressure of the fluid in the chambers 38 has been reduced to the pressure present in the brake pipe 1 upon a full service application of the brakes, the force exerted by the fluid under pressure present in the chambers 38 upon the diaphragms 34 will be sufficient to maintain the diaphragms 30 in engagement with seating faces 28 against the opposing force of the higher fluid under pressure in the branch pipes 13 and the chambers 32 outwardly of the seating faces 28, and of the fluid at brake pipe pressure within the passages 26 within the seating faces 28. Accordingly fluid under pressure cannot flow from the branch pipes 13 to the passages 26, and thence to the brake pipe 1 where it would tend to maintain the brake pipe pressure, and to create a turbulence in the brake pipe 1 which would interfere with the transmission of a reduction in brake pipe pressure throughout the length of the train.

On the reduction in brake pipe pressure to effect a service application of the brakes, fluid under pressure flows from the branch pipe 13 at the rear of the train to the brake pipe 1, since as pointed out above, the control valve device 15 at this end of the train is not conditioned to cut off communication between the branch pipe and the brake pipe. However, the supply of fluid under pressure to the brake pipe 1 at this point does not interfere with the transmission of a reduction in brake pipe pressure throughout the train, and does not create an objectionable turbulence in the brake pipe.

In order to effect a release of the brakes following an application, the handle of the brake valve 10 at the forward end of the leading car is returned to the release position in which fluid under pressure is again supplied from the supply pipe 2 to the branch pipe 13, from which it flows to the control valve device 15 and thence to the brake pipe 1 to increase the pressure of the fluid in the brake pipe. On this increase in the pressure of the fluid in the brake pipe, fluid flows to the brake controlling valve devices 6 and causes the pistons thereof to move to their release positions to release fluid under pressure from the brake cylinders 8, and to permit the recharge of the auxiliary reservoirs 7.

On this increase in the pressure of the fluid in the brake pipe 1, fluid under pressure flows by way of the pipes 48 to the chambers 38 in the control valve devices 15 at the coupled ends of the cars to restore the pressure of the fluid in the chambers 38 to the pressure carried in the brake pipe.

In order to effect an emergency application of the brakes, the handle of the brake valve 10 at the forward end of the leading car is turned to the emergency application position in which fluid under pressure is released from the branch pipe 13 at an emergency rate, and fluid under pressure thereupon flows from the brake pipe 1 to the branch pipe 13 to reduce brake pipe pressure at an emergency rate.

On a reduction in brake pipe pressure at an emergency rate, the vent valve devices 5 operate in the usual manner to vent fluid locally from the brake pipe and hasten the reduction in brake pipe pressure.

On this reduction in the pressure of the fluid in the brake pipe at an emergency rate, the brake controlling valve devices 6 operate in the usual manner to supply fluid under pressure from the auxiliary reservoirs 7 to the brake cylinders 8 to effect an emergency application of the brakes.

On this reduction in the pressure of the fluid in the brake pipe, fluid flows to the brake pipe from the chambers 38 in the control valve devices 15 at the coupled ends of the cars. The reduction in the pressure of the fluid in the chambers 38 will take place slowly however, because of the restricted flow capacity of the chokes 42, with the result that the pressure of the fluid in the chambers 38 will be maintained at a value high enough to maintain the diaphragms 30 in engagement with the seating faces 28 until after a substantial reduction in brake pipe pressure has been effected.

The degree of reduction in brake pipe pressure which is effected before the fluid in the chambers 38 has been reduced sufficiently to permit the diaphragms 30 to be moved from the seating faces 28 is great enough to cause operation of the brake controlling valve devices 6 to initiate an emergency application of the brakes.

After a time interval the pressure of the fluid in the chambers 38 is reduced by flow through the chokes 42 to a value such that the force exerted thereby upon the diaphragms 34 is insufficient to maintain the diaphragms 30 in engagement with the seating faces 28 against the opposing force of the fluid under pressure in the branch pipes 13 and the chambers 32, assisted by the reducing brake pipe pressure in the passages 26, and the diaphragms 30 are thereupon moved away from the seating faces 28 with the result that the fluid under pressure present in the branch pipes 13 may then flow to the passages 26 and thence to the brake pipe 1.

However, before this occurs the pressure of the fluid in the brake pipe 1 will have been reduced sufficiently to cause the emergency application of the brakes to be initiated, and the subsequent supply of fluid under pressure to the brake pipe will not have any detrimental effect.

On the reduction in the pressure of the fluid in the brake pipe 1 at an emergency rate, fluid under pressure flows to the brake pipe from the branch pipe 13 at the rear of the train, because as explained above, the control valve device 15 at this end of the train is not conditioned to cut off communication between the branch pipe 13 and the brake pipe 1. However, this is without detrimental consequences, as explained above.

The control valve devices 15 provided by this invention are arranged so that any of the brake valves 10 may be employed at any time to effect an application of the brakes if desired.

Assuming that the brakes are released, and that the brake pipe 1 is charged with fluid under pressure, the control valve devices 15 at the coupled ends of the cars will be conditioned, as described in detail above, to cut off communication between the brake pipe and the branch pipes 13 leading to the brake valves. In addition, the branch pipes 13 leading to these brake valves will be charged with fluid under pressure at the pressure carried in the brake pipe because of the supply of fluid thereto from the chambers 38 past the ball check valves 46, as explained above.

If a trainman located at a point other than at the end of the train desires to make an application of the brakes, he may do so by turning the handle of any one of the brake valve devices at the coupled end of a car to an application position.

On movement of the handle of the brake valve to this position, fluid under pressure is released from the branch pipe 13 associated therewith, and on this reduction in the pressure of the fluid in the branch pipe, fluid flows past the ball check valve 46 and thence through the passage 48 from the chamber 38 in the control valve device 15 associated with this branch pipe. The flow capacity of the passage 48 is such that fluid under pressure may flow from the chamber 38 to the branch pipe 13 at a substantially more rapid rate than fluid under pressure can be supplied to the chamber 38 through the choke 42 with the result that there will be a rapid reduction in the pressure of the fluid in the chamber 38, and a corresponding rapid reduction in the force exerted by this fluid on the diaphragm 34 in opposition to the fluid in the chamber 32 outwardly of the seating face 28, and of the fluid in the passage 26 within the seating face 28.

When the pressure of the fluid in the chamber 38 has been reduced to a relatively low value, which will take place very quickly because of the small volume of this chamber, the higher pressure of the fluid in the passage 26, which is supplied with fluid at brake pipe pressure, will move the diaphragm 30 away from the seating face 28 to thereby permit fluid under pressure supplied from the brake pipe 1 to the passage 26 to flow to the chamber 32, and to the branch pipe 13 leading to the brake valve 10 from which it is released from the atmosphere.

Accordingly there will be a reduction in the pressure of the fluid in the brake pipe, and the brake equipment on the train will operate in the manner described in detail above to effect an application of the brakes.

It will be seen, therefore, that the system provided by this invention incorporates means operable automatically in accordance with whether an end of a car is coupled to another car or not to cut off or to establish communication between the brake pipe and the branch pipe leading to the brake valve at the end of the car. This prevents objectionable flow of fluid from the branch pipe to brake pipe which would interfere with the transmission of a reduction in brake pipe pressure throughout a train on an application of the brakes.

It will be seen also that the system provided by this invention is arranged so that a reduction in brake pipe pressure to effect an application of the brakes may be effected by operation of any of the brake valves, even though the control valve device associated with the branch pipe for this brake valve is conditioned to cut off communication between the brake pipe and the branch pipe.

While one embodiment of the improved fluid pressure brake equipment provided by this invention has been illustrated and described in detail, it should be understood that the invention is not limited to these details of construction, and that numerous changes and modifications may be made without departing from the scope of the following claims.

Having now described my invention, what I claim as new and desire to secure by Letters Patent, is:

1. In a vehicle fluid pressure brake equipment, in combination, a brake pipe, means operative on a reduction in brake pipe pressure to effect an application of the brakes, a brake valve, a branch pipe connecting the brake valve with the brake pipe, and a valve device comprising a movable abutment subject to and operated on a predetermined increase in the pressure of the fluid in a chamber to cut off communication between the brake pipe and the branch pipe, means operative only when the vehicle is connected to another for supplying fluid under pressure to said chamber at a restricted rate, and means operative when the brake valve is conditioned to release fluid from the branch pipe to release fluid from said chamber.

2. In a vehicle fluid pressure brake equipment, in combination, a brake pipe, means operative on a reduction in brake pipe pressure to effect an application of the brakes, a brake valve, a branch pipe connecting the brake valve with the brake pipe, and a valve device comprising a movable abutment subject to and operated on a predetermined increase in the pressure of the fluid in a chamber to cut off communication between the brake pipe and the branch pipe, means operative only when the vehicle is connected to another for supplying fluid under pressure to said chamber at a restricted rate, a communication through which fluid may flow from said chamber to said branch pipe, and a check valve operative to prevent back flow of fluid from the branch pipe to said chamber through said communication.

3. In a vehicle fluid pressure brake equipment, in combination, a brake pipe, means operative on a reduction in brake pipe pressure to effect an application of the brakes, a brake valve, a branch pipe connecting the brake valve with the brake pipe, and a valve device comprising a movable abutment subject to and operated on a predetermined increase in the pressure of the fluid in a chamber to cut off communication between the brake pipe and the branch pipe, means operative only when the vehicle is connected to another for supplying fluid under pressure to said chamber at a predetermined rate, a communication through which fluid may flow from said chamber to said branch pipe at a rate more rapid than said predetermined rate, and a check valve operative to prevent back flow of fluid from the branch pipe to said chamber through said communication.

4. In a vehicle fluid pressure brake equipment, in combination, a brake pipe, means operative on a reduction in brake pipe pressure to effect an application of the brakes, a brake valve, a branch pipe connecting the brake valve with the brake pipe, and a valve device comprising a movable abutment subject to and operated on a predetermined increase in the pressure of the fluid in a chamber to cut off communication between the brake pipe and the branch pipe, means operative only when the vehicle is connected to another for supplying fluid under pressure to said chamber at a predetermined rate, and means for releasing fluid from said chamber at a rate more rapid than said predetermined rate on the release of fluid from said branch pipe.

5. In a vehicle fluid pressure brake equipment, in combination, a brake pipe, means operative on a reduction in brake pipe pressure for effecting an application of the brakes, a brake valve, a branch pipe connecting the brake valve with the brake pipe, valve means subject to the opposing pressures of the fluid in the brake pipe and of the fluid in a chamber for controlling communication between the brake pipe and the branch pipe, means for supplying fluid under pressure to said chamber at a predetermined rate, and means operative on the release of fluid under pressure from the branch pipe for releasing fluid from said chamber at a rate more rapid than said predetermined rate.

6. In a vehicle fluid pressure brake equipment, in combination, a brake pipe, means operative on a reduction in brake pipe pressure to effect an application of the brakes, a brake valve, a branch pipe connecting the brake valve with the brake pipe, and a valve device comprising a movable abutment subject to and operated on a predetermined increase in the pressure of the fluid in a chamber to cut off communication between the brake pipe and the branch pipe, means operative only when the vehicle is connected to another for supplying fluid under pressure to said chamber at a predetermined rate, a communication through which fluid may be released from said chamber at a rate more rapid than said predetermined rate on the release of fluid from said branch pipe, and means for preventing back flow of fluid from the branch pipe to said chamber through said communication.

7. In a vehicle fluid pressure brake equipment, in combination, a brake valve mounted on said vehicle adjacent an end thereof, a brake pipe on the vehicle and having a portion at said vehicle end which is supplied with fluid under pressure only when said end of the vehicle is coupled to another, means subject to and operated on a reduction in brake pipe pressure for effecting an application of the brakes, a branch pipe connecting the brake valve with the brake pipe, valve means subject to and operated on an increase in the pressure of the fluid in a chamber to cut off communication between the brake pipe and the branch pipe, means for supplying fluid under pressure to said chamber from said brake pipe portion which is charged with fluid under pressure only when the end of the car is coupled to another car, and means operative on the release of fluid from the branch pipe to release fluid from said chamber.

8. In a vehicle fluid pressure brake equipment, in combination, a brake valve mounted on said vehicle adjacent an end thereof, a brake pipe on the vehicle and having a portion at said vehicle end which is supplied with fluid under pressure only when said end of the vehicle is coupled to another, means subject to and operated on a reduction in brake pipe pressure for effecting an application of the brakes, a branch pipe connecting the brake valve with the brake pipe, valve means subject to and operated on an increase in the pressure of the fluid in a chamber to cut off communication between the brake pipe and the branch pipe, means for supplying fluid under pressure to said chamber at a predetermined rate from said brake pipe portion which is charged with fluid under pressure only when the end of the car is coupled to another car, a communication through which fluid may flow from said chamber to the branch pipe at a rate more rapid than said predetermined rate, and a check valve for preventing flow of fluid from said branch pipe to said chamber through said communication.

9. In a vehicle fluid pressure brake equipment, in combination, a brake pipe, means operated on a reduction in brake pipe pressure to effect an application of the brakes, a brake valve, a branch pipe connecting the brake valve with the brake pipe, and valve means controlling communication between the brake pipe and the branch pipe, said valve means being subject to and operated on an increase in the pressure of the fluid in a chamber to cut off communication between the branch pipe and the brake pipe, means for supplying fluid under pressure to said chamber at a predetermined rate, and means operative on the release of fluid under pressure from the branch pipe for releasing fluid from said chamber at a rate more rapid than said predetermined rate.

10. In a vehicle fluid pressure brake equipment, in combination, a brake pipe, means operated on a reduction in brake pipe pressure to effect an application of the brakes, a brake valve, a branch pipe connecting the brake valve with the brake pipe, and valve means controlling communication between the brake pipe and the branch pipe, said valve means being subject to and operated on an increase in the pressure of the fluid in a chamber to cut off communication between the branch pipe and the brake pipe, means for supplying fluid under pressure to said chamber at a predetermined rate, a communication through which fluid under pressure may flow from said chamber to the branch pipe at a rate more rapid than said predetermined rate on a reduction in the pressure of the fluid in the branch pipe, and a check valve for preventing back flow of fluid from the branch pipe to said chamber through said communication.

11. In a vehicle fluid pressure brake equipment, in combination, a brake pipe, a brake valve device, a branch pipe for connecting the brake valve device with the brake pipe, and a valve device comprising movable abutment means for controlling communication from the branch pipe to the brake pipe, said movable abutment means being subject on one side to the fluid pressure in a chamber communicating with the brake pipe through a restricted port and on the opposite side to the pressure of fluid in the branch pipe, and said branch pipe being charged with fluid under pressure through a communication leading to said chamber.

12. In a vehicle fluid pressure brake equipment, in combination, a brake pipe, a brake valve device, a branch pipe for connecting the brake valve device with the brake pipe, and a valve device comprising movable abutment means for controlling communication from the branch pipe to the brake pipe, said movable abutment means being subject on one side to the fluid pressure in a chamber communicating with the brake pipe through a restricted port and on the opposite side to the pressure of fluid in the branch pipe, and said branch pipe being charged with fluid under pressure through a communication leading to said chamber, said movable abutment means being normally operative by fluid under pressure in said chamber to close the communication from the branch pipe to the brake pipe.

13. In a vehicle fluid pressure brake equipment, in combination, a brake pipe, a brake valve device, a branch pipe for connecting the brake valve device with the brake pipe, and a valve device comprising movable abutment means for controlling communication from the branch pipe to the brake pipe, said movable abutment means being subject on one side to the fluid pressure in a chamber communicating with the brake pipe through a restricted port and on the opposite side to the pressure of fluid in the branch pipe, and said branch pipe being charged with fluid under pressure through a communication leading to said chamber, said movable abutment means being normally operative by fluid under pressure in said chamber to close the communication from the branch pipe to the brake pipe, and being operative upon a reduction in fluid pressure in the branch pipe at a greater rate than fluid can flow from the brake pipe to said chamber for opening the communication from the branch pipe to the brake pipe.

14. In a vehicle fluid pressure brake equipment, in combination, a brake pipe, a brake valve device, a branch pipe for connecting the brake valve device with the brake pipe, and valve means comprising movable abutment means for controlling communication from the branch pipe to the brake pipe, said movable abutment means being subject on one side to fluid pressure in a chamber and being subject on the other side to the pressure of the fluid in the brake pipe, means for supplying fluid under pressure to said chamber at a restricted rate, said branch pipe being charged with fluid under pressure through a communication leading from the branch pipe to said chamber.

15. In a vehicle fluid pressure brake equipment, in combination, a brake pipe, a brake valve device, a branch pipe for connecting the brake valve device with the brake pipe, and valve means comprising movable abutment means for controlling communication from the branch pipe to the brake pipe, said movable abutment means being subject on one side to fluid pressure in a chamber and being subject on the other side to the pressure of the fluid in the brake pipe, means for supplying fluid under pressure to said chamber at a restricted rate, said branch pipe being charged with fluid under pressure through a communication leading from the branch pipe to said chamber, said movable abutment means being normally operative by fluid under pressure in said chamber to close the communication from the brake pipe to the branch pipe.

16. In a vehicle fluid pressure brake equipment, in combination, a brake pipe, a brake valve device, a branch pipe for connecting the brake valve device with the brake pipe, and valve means comprising movable abutment means for controlling communication from the branch pipe to the brake pipe, said movable abutment means being subject on one side to fluid pressure in a chamber and being subject on the other side to the pressure of the fluid in the brake pipe, means for supplying fluid under pressure to said chamber at a restricted rate, said branch pipe being charged with fluid under pressure through a communication leading from the branch pipe to said chamber, said movable abutment means being normally operative by fluid under pressure in said chamber to close the communication from the brake pipe to the branch pipe, and being operative upon a reduction in fluid pressure in the branch pipe at a greater rate than fluid can flow to said chamber for opening the communication from the branch pipe to the brake pipe.

17. In a vehicle fluid pressure brake equipment, in combination, a brake pipe, a brake valve, a branch pipe for connecting the brake valve with the brake pipe, and valve means comprising differential diaphragm means for controlling communication from the branch pipe to the brake pipe, said diaphragm means being subject on one side to the fluid in a chamber adapted to be supplied with fluid under pressure at a restricted rate from the brake pipe and being subject on the other side to the fluid in the brake pipe and to the fluid in the branch pipe, said diaphragm means having a substantially larger area subject to fluid in said chamber than that subject to fluid in the brake and branch pipes whereby on the supply of fluid to said chamber said diaphragm means is operative to cut off communication between the branch pipe and the brake pipe, and a communication through which fluid may flow from said chamber to the branch pipe at a rapid rate on a reduction in the pressure of the fluid in said branch pipe.

18. In a vehicle fluid pressure brake equipment, in combination, a brake pipe, a brake valve, a branch pipe for connecting the brake valve with the brake pipe, and valve means comprising differential diaphragm means for controlling communication from the branch pipe to the brake pipe, said diaphragm means being subject on one side to the fluid in a chamber adapted to be supplied with fluid under pressure at a restricted rate from the brake pipe and being subject on the other side to the fluid in the brake pipe and to the fluid in the branch pipe, said diaphragm means having a substantially larger area subject to fluid in said chamber than that subject to fluid in the brake and branch pipes whereby on the supply of fluid to said chamber said diaphragm means is operative to cut off communication between the branch pipe and the brake pipe, a communication through which fluid may flow from said chamber to said branch pipe at a rapid rate on the release of fluid from the branch pipe, and a check valve operative to prevent flow of fluid from said branch pipe to said chamber through said communication.

EVERETT P. SEXTON.